United States Patent [19]
Yeh et al.

[11] Patent Number: 5,903,750
[45] Date of Patent: May 11, 1999

[54] DYNAMIC BRANCH PREDICTION FOR BRANCH INSTRUCTIONS WITH MULTIPLE TARGETS

[75] Inventors: Tse-Yu Yeh, Milpitas; Mircea Poplingher, Campbell; Wenliang Chen, Sunnyvale; Hans Mulder, San Francisco, all of Calif.

[73] Assignee: Institute for the Development of Emerging Architectures, L.L.P., Cupertino, Calif.

[21] Appl. No.: 08/752,785

[22] Filed: Nov. 20, 1996

[51] Int. Cl.$^6$ .......................................................... G06F 9/32
[52] U.S. Cl. ............................................ 395/583; 395/587
[58] Field of Search ..................................... 395/580, 581, 395/582, 583, 584, 585, 586, 587

[56] References Cited

U.S. PATENT DOCUMENTS

| | | | |
|---|---|---|---|
| 4,725,947 | 2/1988 | Shonai et al. | 395/585 |
| 5,050,068 | 9/1991 | Dollas et al. | 395/382 |
| 5,287,467 | 2/1994 | Blaner et al. | 395/582 |
| 5,333,283 | 7/1994 | Emma et al. | 395/583 |
| 5,353,421 | 10/1994 | Emma et al. | 395/587 |
| 5,423,011 | 6/1995 | Blaner et al. | 395/587 |
| 5,434,985 | 7/1995 | Emma et al. | 395/587 |
| 5,442,760 | 8/1995 | Rustad et al. | 395/391 |
| 5,659,722 | 8/1997 | Blaner et al. | 395/581 |

Primary Examiner—Parshotam S. Lall
Assistant Examiner—Viet Vu
Attorney, Agent, or Firm—Blakely, Sokoloff, Taylor & Zafman LLP

[57] ABSTRACT

A method and apparatus for dynamically predicting the outcome and the target address of a multiple-target branch instruction, where the multiple-target branch instruction contains at least two potential target addresses, not including the fall through address. In addition, this method and apparatus can also be used to predict multiple single-target branches simultaneously. The apparatus stores information indicating the outcome of previous executions and predictions of the multiple-target branch instruction in a branch prediction table. In addition, multiple target addresses (at least two) are associated with the multiple-target branch instruction. Using the information indicating the outcome of the previous execution of the multiple-target branch instruction, the apparatus predicts the outcome of a next execution of the multiple-target branch instruction, and predicts which, if any, of the target addresses associated with the multiple-target branch instruction, will be taken.

19 Claims, 5 Drawing Sheets

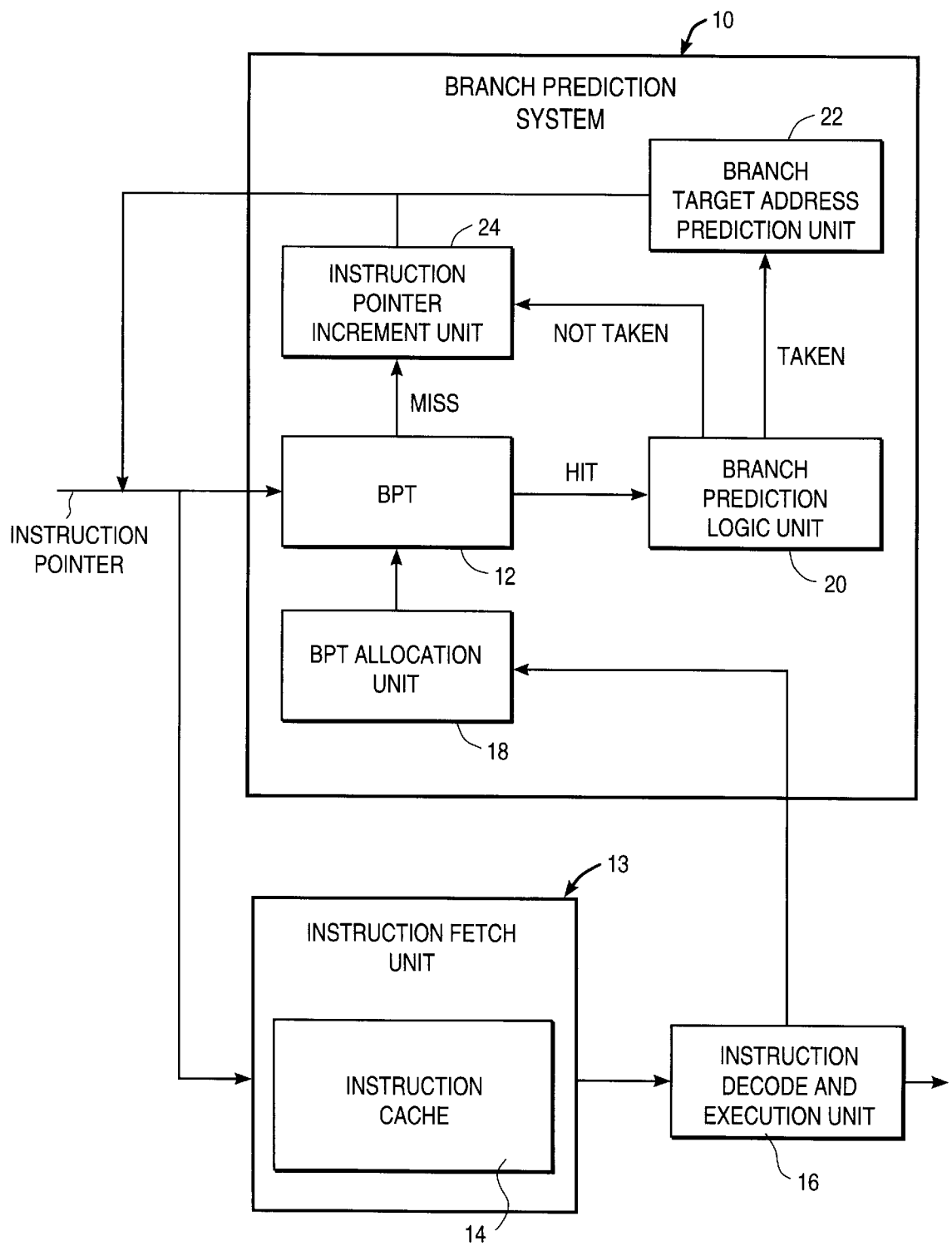
FIG_1A (PRIOR ART)

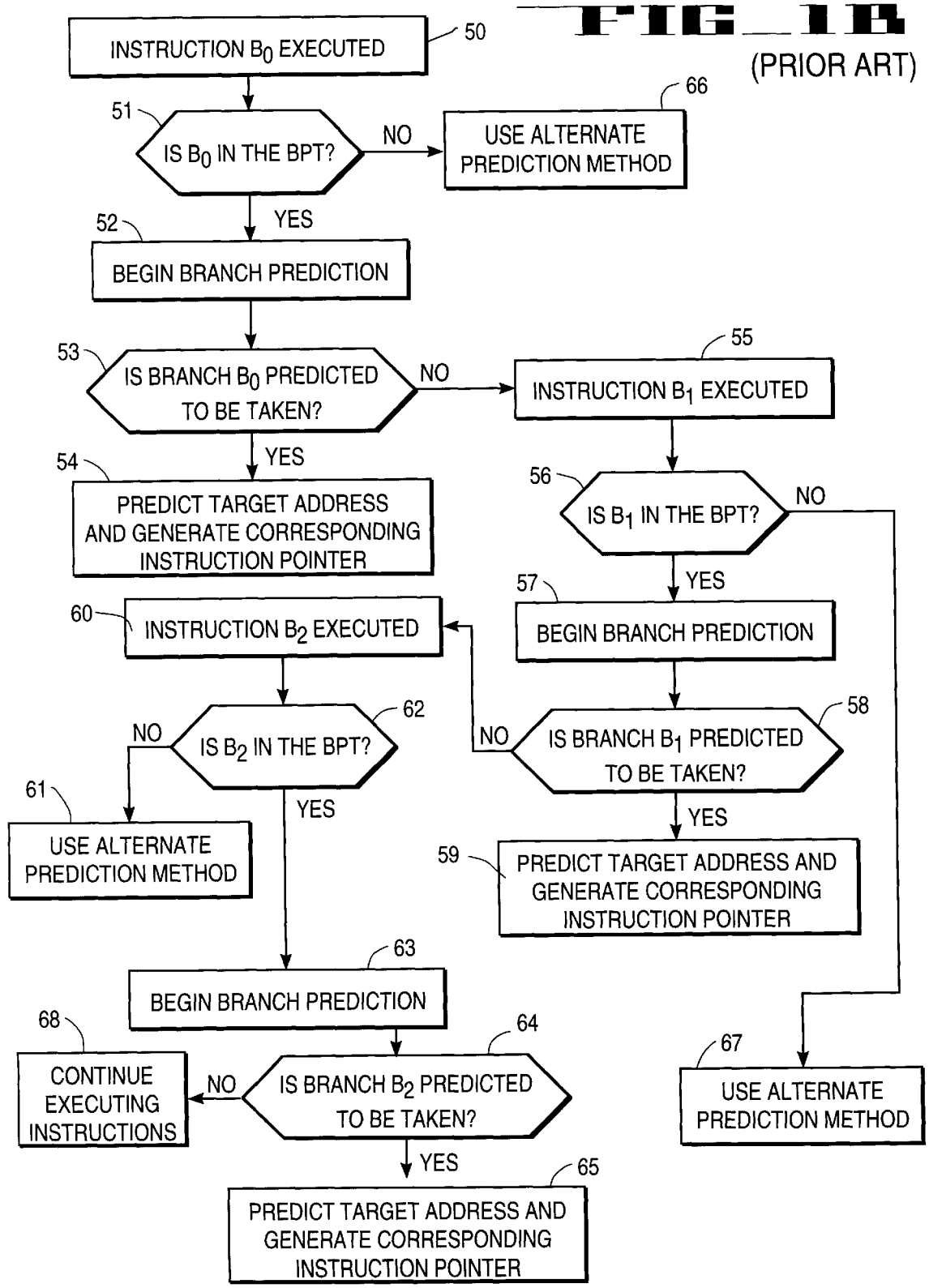
FIG_1B (PRIOR ART)

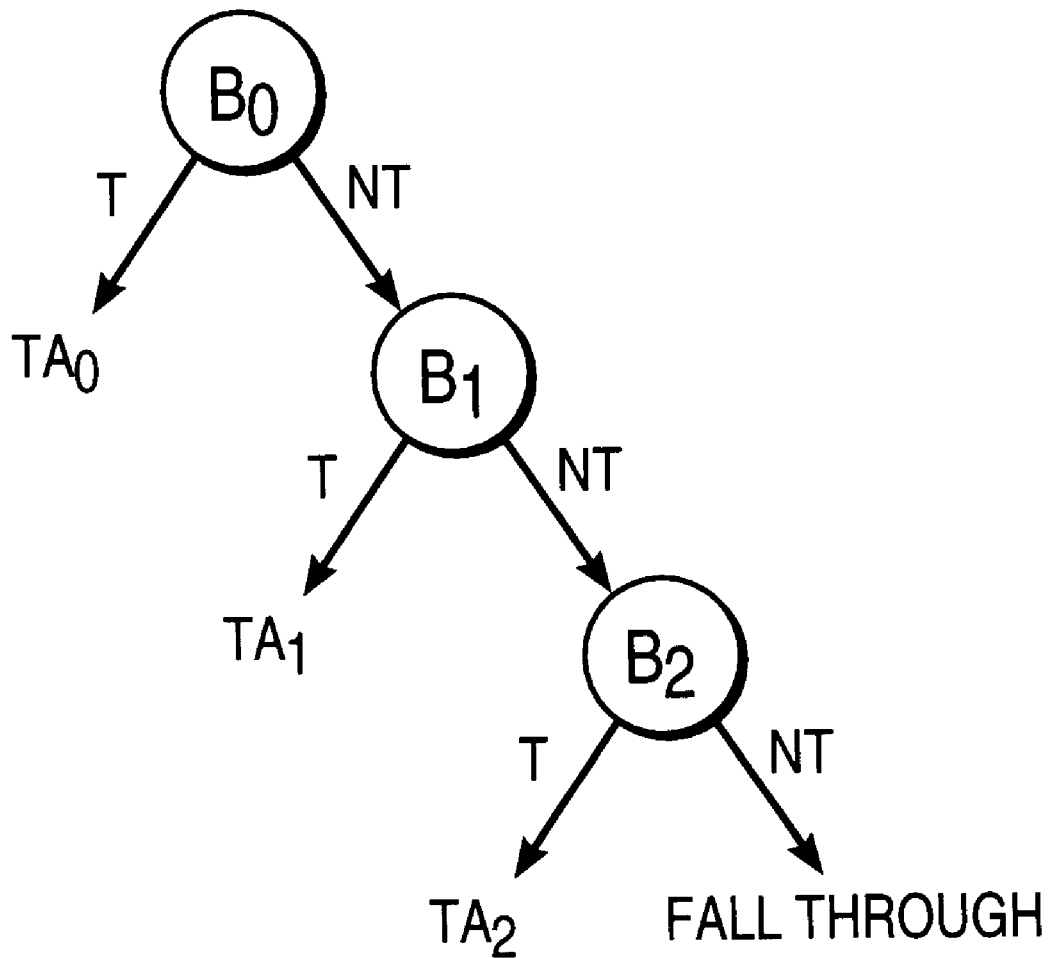
FIG_1C
(PRIOR ART)

EXEMPLARY ENTRY IN THE BRANCH PREDICTION TABLE

INSTRUCTION BUNDLE

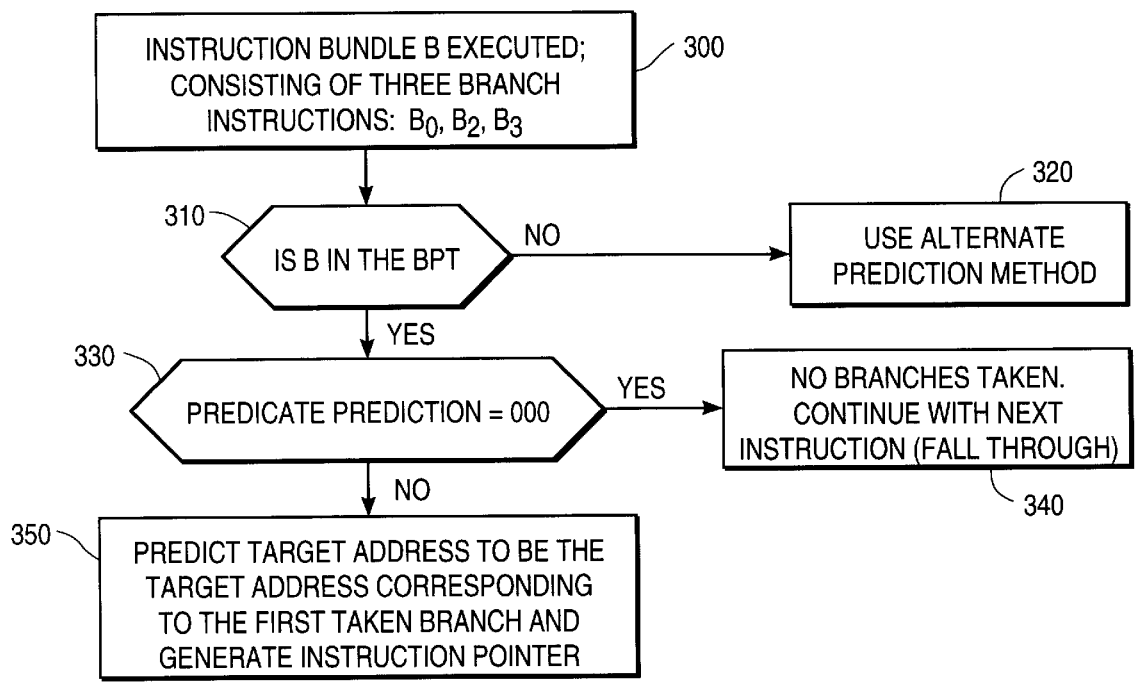
FIG_3A
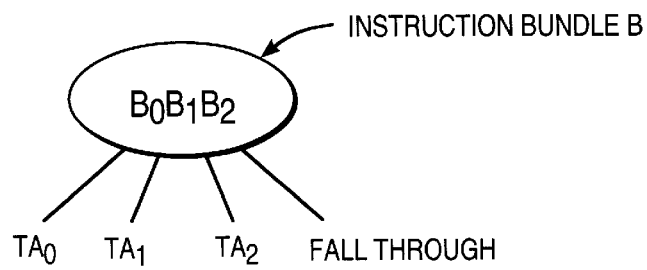
FIG_3B

DYNAMIC BRANCH PREDICTION FOR BRANCH INSTRUCTIONS WITH MULTIPLE TARGETS

FIELD OF THE INVENTION

The invention relates to a method and apparatus for performing branch predictions within microprocessors. More specifically, the invention relates to predicting the outcome and target address of branch instructions for use within a microprocessor having multiple-target branch instructions, or bundles of instructions containing multiple single-target branch instructions.

BACKGROUND OF THE INVENTION

Microprocessors often employ the use of pipelining to enhance performance. Within a pipelined microprocessor, the functional units necessary for executing different stages of an instruction are operated simultaneously on multiple instructions to achieve a degree of parallelism leading to performance increases over non-pipelined microprocessors. As an example, an instruction fetch unit, an instruction decode unit and an instruction execution unit may operate simultaneously. During one clock cycle, the instruction execution unit executes a first instruction while the instruction decode and execute unit decodes a second instruction and the fetch unit fetches a third instruction. During a next clock cycle, the execution unit executes the newly decoded instruction while the instruction decode and execute unit decodes the newly fetched instruction and the fetch unit fetches yet another instruction. In this manner, neither the fetch unit nor the decode and execute unit need to wait for the instruction execution unit to execute the last instruction before processing new instructions. In state-of-the-art microprocessors, the steps necessary to fetch and execute an instruction are sub-divided into a larger number of stages to achieve a deeper degree of pipelining.

A pipelined CPU operates most efficiently when the instructions are executed in the sequence in which the instructions appear in memory. Unfortunately, this is typically not the case. Rather, computer programs typically include a large number of branch instructions, which, upon execution, may cause instructions to be executed in a sequence other than as set forth in memory. More specifically, when a branch instruction is encountered in the program flow, execution continues either with the next sequential instruction from memory or execution jumps to an instruction specified at a "branch target" address. Typically the branch specified by the instruction is said to be "Taken" if execution jumps and "Not Taken" if execution continues with the next sequential instruction from memory.

Branch instructions are either unconditional, meaning the branch is taken every time the instruction is executed, or conditional, meaning the branch is taken or not depending upon a condition. Instructions to be executed following a conditional branch are not known with certainty until the condition upon which the branch depends is resolved. However, rather than wait until the condition is resolved, state-of-the-art microprocessors may perform a branch prediction, whereby the microprocessor tries to determine whether the branch will be Taken or Not Taken, and if Taken, to predict or otherwise determine the target address for the branch. If the branch instruction is predicted to be Taken, the microprocessor fetches and speculatively executes the instruction found at the predicted branch target address. The instructions executed following the branch prediction are "speculative" because the microprocessor does not yet know whether the prediction will be correct or not. Accordingly, any operations performed by the speculative instructions cannot be fully completed. For example, if a memory write operation is performed speculatively, the write operation cannot be forwarded to external memory until all previous branch conditions are resolved, otherwise the instruction may improperly alter the contents of the memory based on a mispredicted branch. If the branch prediction is ultimately determined to be correct, the speculatively executed instructions are retired or otherwise committed to a permanent architectural state. In the case of a memory write, the write operation is normally forwarded to external memory. If the branch prediction is ultimately found to be incorrect, then any speculatively executed instructions following the mispredicted branch are typically flushed from the system. For the memory write example, the write is not forwarded to external memory, but instead is discarded.

As can be appreciated, when a branch prediction is correct, a considerable improvement in processor performance is gained. If the branch prediction is incorrect, the microprocessor is no worse off than had it initially waited until resolution of the branch condition.

A wide variety of techniques have been developed for performing branch prediction. Typically, various tables are provided for storing a history of previous branch executions or branch predictions along with indications of whether the branch predictions were proven to be correct or not. Predictions are made for newly encountered branches by evaluating the history of prior branch executions or prior branch predictions. In some microprocessors, the logic for performing branch predictions is quite complex and time consuming. It is, however, desirable to perform the branch prediction as quickly as possible. Ideally, a branch prediction is performed using the same number of clock cycles as it takes to fetch an instruction, thereby ensuring that the instruction cache need not be stalled while waiting for instruction pointers corresponding to predicted branches.

Advanced compiler techniques now used, reorder the instructions of a program to move non-branch instructions forward in the execution so instructions can be executed without instruction flow changes. This reordering results in multiple branch instructions being scheduled together at the bottom of an instruction scheduling block. Prior art branch prediction systems require each branch instruction to be separately predicted and fetched, which requires multiple clock cycles. Therefore, to improve performance, it is desirable for the system to be able to predict the outcome of multiple branch instructions simultaneously, instead of sequentially.

SUMMARY OF THE INVENTION

A method and apparatus for dynamically predicting the target address of multiple-target branch instructions, where a multiple-target branch instruction contains at least two potential target addresses, not including the fall through address. This apparatus stores information indicating the outcome of previous executions of the multiple-target branch instruction in a branch prediction table and stores information indicating the predictions made for previous multiple-target branch instructions. In addition, multiple target addresses (at least two) are associated with the multiple-target branch instruction. Using the information indicating the outcome of the previous execution or the information indicating previous predictions of the multiple-target branch instruction, the apparatus predicts the outcome of a next execution of the multiple-target branch instructions, and predicts which, if any, of the target addresses associated with the multiple-target branch instruction, will be taken.

Alternatively, the method and apparatus can be used for dynamically predicting the target address of multiple single-target branch instructions. The apparatus stores information indicating the outcome of previous executions of the multiple single-target branch instructions in a branch prediction table and stores information indicating the outcome of previous predictions made for previous single-target branch instructions. Using the information indicating the outcome of previous executions or the information indicating previous predictions of the single-target branch instructions, the apparatus predicts the outcome of a next execution of the multiple single-target branches, and predicts which, if any, of the target addresses associated with the multiple single target branches will be taken.

BRIEF DESCRIPTION OF THE DRAWINGS:

FIG. 1(a) is a block diagram of a branch prediction system. (Prior Art)

FIG. 1(b) is a flow diagram of a method for predicting multiple branch instructions. (Prior Art)

FIG. 1(c) is a diagram of the method shown in FIG. 1(b). (Prior Art)

FIG. 3(a) is a flow diagram of the method of predicting the target address of an instruction bundle containing three single-target branch instructions or a multiple-target branch instruction.

FIG. 3(b) is a diagram of the method shown in FIG. 3(a).

DETAILED DESCRIPTION OF THE INVENTION

Figure 2A:
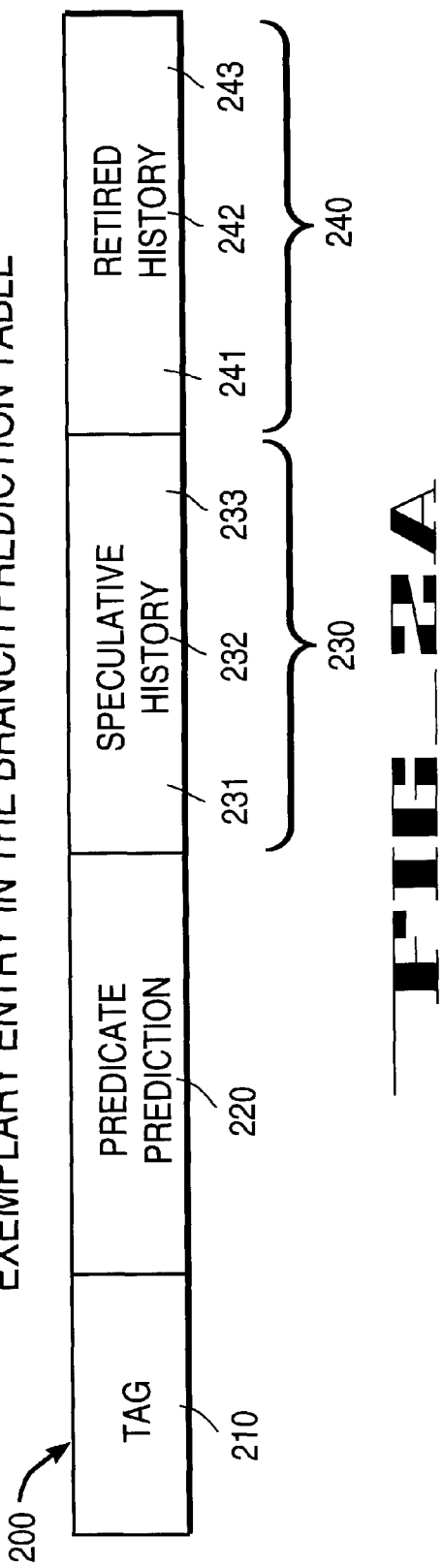
FIG. 2(a) is an exemplary entry of a branch prediction table.
Figure 2B:
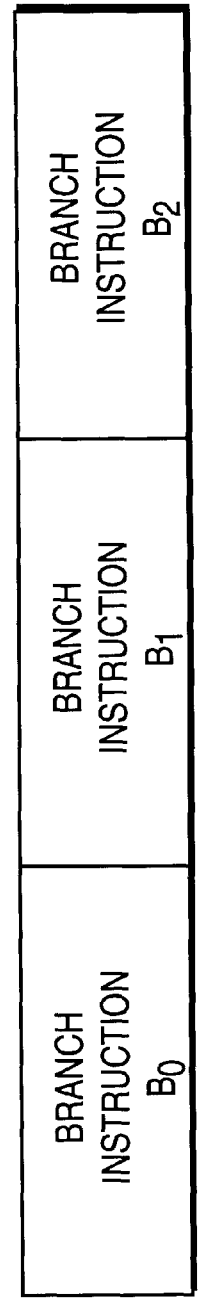
FIG. 2(b) is an exemplary branch instruction bundle.

In the following description, for purpose of explanation and not limitation, specific details are set forth in order to provide a thorough understanding of the present invention. However, it will be apparent to one sided in the art that the present invention may be practiced in other embodiments that depart from these specific details. In other instances, detailed descriptions of well-known methods, devices and circuits are omitted so as to not obscure the description of the present invention with unnecessary detail.

The present invention improves branch prediction by allowing the parallel prediction of multiple single-target branches in one cycle, or alternatively, it enables the prediction of a multiple-target branch instruction.

In one implementation, the multiple-target branch instruction contains three possible target addresses and a fall-through address. However, the multiple-target branch instruction could contain two or more target addresses and a fall-through address, and is not limited to having three target addresses as described below. Similarly, the embodiment described also supports a system using three single-target branch instructions per instruction bundle. As in the system containing a multiple-target branch instruction, the system consisting of the single-target branch instructions is not limited to three instructions per instruction bundle, but could also be used for a system containing two or more single-target branch instructions per bundle.

To expedite branch prediction, some state-of-the-art microprocessors include a branch prediction table (BPT) which provides the instruction cache with the target addresses of the most recently predicted branches along with the corresponding prediction information, such as a brief history of previous executions and/or predictions for that branch and the success thereof. FIG. 1(a) illustrates a prior art branch prediction system incorporating a BPT. More specifically, FIG. 1(a) illustrates a branch prediction system 10 having a BPF 12, an instruction fetch unit (IFU) 13 incorporating an instruction cache (ICache) 14, and an instruction decode and execute unit 16. A BPT allocation unit 18 allocates entries in the BPT 12. A branch prediction unit 20 performs branch predictions based upon hit signals and branch history received from the BPT 12. The branch prediction is either Taken or Not Taken. A branch target address prediction unit 22 attempts to predict the address for any branch predicted to be Taken.

In use, an instruction pointer specifying a new instruction is received by the BPT 12 and the IFU 13. While the IFU 13 fetches an instruction corresponding to the instruction pointer, perhaps by accessing the ICache 14, the BPT determines whether the information corresponding to a previous branch prediction for the same instruction is contained within its cache lines and generates a hit signal or a miss signal accordingly. In many implementations, the BPT 12 is accessed using a tag value provided within the instruction pointer and corresponding to tag values employed by the ICache 14 for identifying cache lines therein. Initially, the BPT 12 is empty and a miss signal is therefor generated. An instruction pointer increment unit 24 receives the miss signal and increments the instruction pointer by one to identify the next sequential instruction. In other words, when the BPT 12 generates a miss signal, the overall system assumes that either the corresponding instruction does not contain a branch or, if it does contain a branch, the branch will be Not Taken. The newly incremented instruction pointer is fed back to both the BPT 12 and the IFU 13. The BPT 12 and the IFU 13 input and process the new instruction. Simultaneously, instruction decode and execute unit 16 decodes the instruction previously fetched by the IFU 13. The instruction decode and execute unit 16 examines a branch field within the instruction received from the IFU 13 to determine whether the instruction includes a branch condition. If so, the instruction decode and execute unit 16 activates the BPT allocate unit 18 to allocate an entry with the BPF 12 corresponding to the branch. Depending upon the implementation, the entry within the BPT 12 identifies the instruction pointer or a corresponding tag address, as well as other information such as the type of branch.

As the execution continues, more and more entries are allocated within the BPT 12 based upon branch instructions fetched by the IFU 13. Eventually, the BPT 12 receives an instruction pointer corresponding to an entry contained therein and generates a hit signal. The branch prediction logic unit 20 then predicts whether the branch is to be Taken or Not Taken. To this end, the branch prediction unit may access information stored within the hit entry of the BPT 12 as well as other prediction information contained within separate tables (not shown). If the prediction is Not Taken, then the instruction increment unit 24 is again activated to increment the instruction pointer by one. If the branch is predicted to be Taken, then the branch target address prediction unit 22 is activated to predict the resulting branch target address. In many cases, the branch address is merely specified within the branch instruction itself and the branch target address prediction is therefore straightforward. In other cases, branch target address predictions may be somewhat more complex. In either case, the branch target address prediction unit 22 outputs a new instruction pointer corresponding to the branch target address which fed back to both the BPF 12 and the IFU 13. Preferably, the various components of the branch prediction system are configured to perform a branch prediction in the same number of clock cycles that the IFU 13 requires to fetch one instruction, typically one or two clock cycles.

As noted, instructions fetched by the IFU 13 and decoded by the instruction decode and execute unit 16 are executed elsewhere within the microprocessor. If the instructions were fetched using instruction pointers generated by the branch prediction system, then the instructions are initially regarded as being speculative. Ultimately, branch conditions contained therein are evaluated and the accuracy of previous branch predictions can be verified. If correct, the speculatively executed instructions are then retired or otherwise committed. If incorrect, the instructions are flushed. In either case, entries within the BPT 12 corresponding to the predicted branches are updated to reflect whether the prediction was correct. Depending upon the implementation, each entry within the BPT 12 may store a history of branch predictions along with an indication of whether the predictions were correct. Any additional tables accessed by branch prediction unit 20 may also be updated.

In this manner, the branch prediction system develops a history of branch predictions to assist in refining future predictions to achieve ever increasing ratios of correct predictions to incorrect predictions. Of course, the BPT 12 is of a finite size and entries may need to be deallocated to allow room for allocation of new entries corresponding to newly found branches. Accordingly, circumstances may arise where the BPT 12 receives an instruction pointer corresponding to a previously predicted branch for which no entry is found within the BPT 12. In the implementation of FIG. 1(a), a miss signal is generated and the instruction pointer is incremented. In other implementations, the branch prediction system may perform a branch prediction, perhaps using tables associated with the branch prediction unit, even though an entry is not found within the BPT 12. In other words, branch prediction need not be limited only to branches having entries allocated within the BPT 12. With the implementation as shown in FIG. 1(a), however, a branch prediction of Not Taken is implicitly provided whenever no entry is found within the BPT 12.

To predict the target addresses of more than one branch instruction, the BPT must be accessed separately for each branch instruction, as shown in FIG. 1 (b) (Prior Art). First, the BPT is accessed to determine whether the information corresponding to the first branch instruction ($B_0$) is contained within the BPT (step 51). If the branch instruction is found within the BPT, the system then predicts, using the method described above, whether the branch is Taken or Not Taken (steps 52–53). If the branch is predicted to be Taken, then it is not necessary to predict the target address of the next branch instruction $B_1$ because, since the first branch was taken, the instruction pointer has now jumped to a different address, as predicted by the branch target address prediction unit 22 (step 54). However, if the first branch instruction $B_0$ is predicted to be Not Taken (step 55), then the BPT must be accessed to determine if the information corresponding to the second branch instruction $B_1$ is contained within the BPT (step 56). Once again, if the information corresponding to the second branch instruction $B_1$ is within the BPF, then a prediction is made whether the branch will be Taken or Not Taken (steps 57–58). However, in either of these cases, if the information is not found within the BPT then another method of determining a prediction for the target address must be used (steps 66–67). This process is repeated for each branch instruction. (steps 60–65)

FIG. 1(c) shows how the prior art system predicts three consecutive branch instructions sequentially. If $B_0$ is predicted to be Not Taken, then the fall through address is speculatively executed next. In this case, the next instruction is the branch instruction $B_1$, and therefore the outcome of the branch instruction $B_1$ will next be predicted. If $B_0$ is predicted to be Taken, then the speculative execution of the instructions jumps to the target address associated with $B_0$ ($TA_0$), and the branch instruction $B_1$ is speculatively not executed. Similarly, if $B_1$ is predicted to be Not Taken, then the branch instruction $B_2$ is predicted next, otherwise, the speculative execution of the instructions jumps to the target address associated with $B_1$ ($TA_1$). Finally, if $B_2$ is predicted to be Not Taken, then the next instruction in the instruction sequence is speculatively executed; otherwise, the speculative execution of the instructions jumps to the target address associated with $B_2$ ($TA_2$)

In the above system, if the branch instruction is not found in the BPT, then the branch is predicted to be Not Taken. Using such a method of always predicting Not Taken when the instruction is not found in the BPT results in a degradation in performance. Furthermore, even if all of the branch instructions are found within the BPT, a system such as that described above requires several clock cycles in order to determine which branch, of the multiple branches fetched, will be taken. In addition, this system is limited to use when only one instruction is contained per cache line.

Each cache line in the instruction cache (ICache) may store more than one instruction. Typically a group of the separate instructions are referred to as instruction bundles. During one clock cycle, the IFU may fetch two or more instructions, usually one complete cache line. In the case where the bundle includes two branch instructions, the BPT will have either two entries corresponding to the cache line, one entry, or no entries. However, there is not necessarily a direct correlation between the entries of the BPT and the branch instructions contained in the cache line. As can be appreciated it is desirable for the BPT, as well as other components of the branch prediction system, to be configured so as to be able to predict the outcome of two or more branches per instruction line.

While some advanced compiler techniques reorder the instructions of a program to move non-branch instructions forward in the execution, this results in multiple branch instructions being ordered such that they will be fetched one after the other. As discussed above, the previous branch prediction method requires each branch instruction to be separately predicted, which requires multiple clocks cycles. Therefore, to improve performance, it is desirable for the system to be able to predict the outcome of multiple branch instructions simultaneously, instead of sequentially.

FIG. 2(a) illustrates an exemplary entry 200 in the BPT. Entry 200 includes a tag value 210, speculative branch history information 230, retired branch history information 240, and a predicate prediction 220. Entry 200 may also contain other information required by the system.

The table entry for the instruction bundle B is accessed by using the tag information for the instruction bundle. The instruction bundle B can be a bundle containing three single-target branch instructions, $B_0$, $B_1$, and $B_2$, or can be a single multiple-target branch instruction having three target addresses $TA_0$, $TA_1$, and $TA_2$. In an instruction bundle containing three single-target branch instructions, the retired branch history information 240 consists of three groups of branch history information bits (241, 242, and 243), one group for each single-target branch instruction. Each retired branch history information group (241, 242, and 243) consists of at least one bit indicating the outcome of a previous branch instruction. In the present embodiment, the retired branch history information group consists of four bits which indicate the outcome of the previous four branch executions of the branch instruction, where a "1" indicates the branch was Taken and a "0" indicates the branch was Not Taken. Similarly, the speculative branch history information 230 consists of three groups of branch history information bits (231, 232, and 233).

The predicate prediction 220 for the instruction bundle B is derived from the history bits of $B_0$, $B_1$, $B_2$ and indicates which of the single-target branch instructions are predicted to be Taken. Any of a variety of prediction methods may be used to determine whether the individual branches will be Taken. One method of predicting the outcome of the individual branches ($B_0$, $B_1$, and $B_2$) is through the use of a pattern history table (not shown). For example, assuming the pattern history table predicts that the branch instruction $B_0$ will be Not Taken, the branch instruction $B_1$ will be Taken and the branch instruction $B_2$ will be Taken, the predicate prediction for the instruction bundle B will be 011, where the first bit of the predicate prediction corresponds to the prediction for $B_0$ (Not Taken), the second bit of the predicate prediction corresponds to the prediction for $B_1$ (Taken), and the third bit of the predicate prediction corresponds to the prediction for $B_2$ (Taken).

Given a predicate prediction of 011, the first Taken branch is $B_1$ as the second bit in the predicate prediction is the first "1" (Taken) and the second bit corresponds to $B_1$ of the instruction bundle. Although $B_2$ is also predicted to be Taken, the prediction of the branches after the first predicted Taken branch does not matter as the prediction for the bundle is predicted to be the first Taken branch. Therefore, since $B_1$ is the first instruction predicted to be Taken the predicted target address of the instruction bundle B will be the target address associated with the branch instruction $B_1$.

The flow diagram of FIG. 3(*a*) is a method for predicting the outcome of an instruction bundle containing several branch instructions. When the instruction bundle B, consisting of branch instructions $B_0$, $B_1$, and $B_2$, is received by the BPT (300), it is first determined whether the instruction bundle B is contained within the table (310). This is done by accessing the BPT to see if the tag associated with the instruction bundle B can be found within the BPT. If the instruction bundle has an entry in the table, then the predicate prediction will be used to predict which of the three target addresses, if any, will be Taken. As described above, the predicate prediction indicates which of the branch instructions are predicted to be Taken. If the predicate prediction is "000", or contains no Taken bits, then the instruction bundle is predicted not to take any of the possible target addresses and will therefore fall through to the next instruction (330, 340). If the predicate prediction contains at least one "1", or at least one Taken bit, then, the instruction bundle is predicted to take one of the target addresses. The first "1" in the predicate prediction value denotes which of the target addresses will be Taken, $TA_0$, $TA_1$, or $TA_2$ (350).

FIG. 3(*b*) illustrates how the system predicts the three branch instructions simultaneously. As shown, if the instruction bundle B is contained within the branch prediction table, then the outcome of the instruction bundle, and therefore, the outcome of the three branch instructions is predicted at once.

Using the above method, a branch prediction system can be modified so as to be able to predict the target address of three branch instructions simultaneously or to predict the target address of a branch instruction containing multiple target addresses.

What is claimed is:

1. A method for predicting the target address of a multiple-target branch instruction, the method comprising the steps of:

(a) generating a branch activity history of the multiple-target branch instruction;

(b) storing multiple target addresses for the multiple-target branch instruction, where the stored target addresses for the multiple-target branch instruction include at least two target addresses which are not a fall-through address;

(c) storing a predicate prediction in a branch prediction table indicating if any of the target addresses is to be taken, and if a target addresses is to be taken, indicating which one of the multiple target addresses is to be taken; and (d) predicting an outcome of a next execution of the multiple-target branch instruction based upon the branch activity history and the predicate prediction.

2. The method of claim 1 where the branch activity history consists of an execution history of the multiple-target branch instruction.

3. The method of claim 1 where the branch activity history consists of a prediction history of the multiple-target branch instruction.

4. The method of claim 1 where the branch activity history consists of an execution history and a prediction history of the multiple-target branch instruction.

5. The method of claim 1 wherein step (c) further comprises the step of:

selecting a fall-through address as the target address in the event that the predicted outcome indicates that none of the target addresses of the multiple-target branch instruction is taken.

6. The method of claim 1 further comprising the step of:

predicting which one of the multiple target addresses stored for the multiple-target branch instruction will be taken.

7. The method of claim 1 further comprising the step of:

storing a tag associated with the multiple-target branch instruction in the branch prediction table;

storing information indicating the branch activity of the multiple-target branch instruction in the branch prediction table such that the information can be accessed through the tag associated with the multiple-target branch instruction; and retrieving the predicate prediction for the multiple-target branch instruction by accessing the table entry associated with the tag for the multiple-target branch instruction.

8. A method for predicting the target address of an instruction bundle containing multiple single-target branch instructions, the method comprising the steps of:

storing information indicating a branch activity history of each single-target branch instruction of the instruction bundle;

using the information indicating the branch activity history of each single-target branch instruction to predict an outcome of a next execution of each single-target branch instruction;

storing a predicate prediction containing the predictions of the outcome of the next execution of each single-target branch instruction in a table entry associated with the instruction bundle; and predicting an outcome of the instruction bundle based on the predicate prediction.

9. The method of claim 8 where the branch activity history consists of execution history of each single-target branch instruction.

10. The method of claim 8 where the branch activity history consists of prediction history of each single-target branch instruction.

11. The method of claim 9 where the branch activity history consists of execution history and prediction history of each single-target branch instruction.

12. The method of claim 8 further comprising the step of:

predicting whether the single-target branch instruction will be taken or not taken on the next execution of the single-target branch instruction.

13. The method of claim 12 further comprising the steps of:

predicting the outcome of the instruction bundle to be the outcome of the first single-target branch instruction in the instruction bundle which is predicted to be taken.

14. The method of claim 8 further comprising the steps of:

storing a tag associated with the instruction bundle in a branch prediction table; and storing a predicate prediction containing the predictions of the outcome of the next execution of each single-target branch instruction in the table entry associated with the instruction bundle tag.

15. The method of claim 8 further comprising the step of:

storing, in a single table entry, the information indicating the outcome of the previous execution of each single-target branch instruction.

16. A branch prediction table in a microprocessor having an instruction cache containing an instruction bundle consisting of two or more branch instructions, the branch prediction table comprising:

a tag entry associated with the instruction bundle;

prediction history information for each branch instruction of the instruction bundle stored in the table entry corresponding to the tag associated with the instruction bundle; and a predicate prediction indicating a prediction of whether a branch instruction will be taken, and if a branch instruction will be taken, indicating a prediction of which branch in the branch bundle will be taken.

17. A branch prediction table in a microprocessor having an instruction cache containing a multiple-target branch instruction, where the multiple-target branch instruction has at least two associated target addresses which are not a fall-through address, the branch prediction table comprising:

a tag entry associated with the multiple-target branch instruction;

prediction history information for the multiple-target branch instruction stored in a table entry corresponding to the tag associated with the multiple-target branch instruction; and a predicate prediction indicating a prediction of whether a branch will be taken, and if a branch instruction will be taken, indicating a prediction of which target addresses of the multiple target addresses will be taken.

18. A processor comprising:

an instruction cache containing an instruction bundle consisting of two or more branch instructions;

a branch prediction table couple to the instruction cache for indicating a prediction of a target address for the instruction bundle, the branch prediction table comprising:

a tag entry associated with the instruction bundle;

prediction history information for each branch instruction of the instruction bundle stored in the table entry corresponding to the tag associated with the instruction bundle; and a predicate prediction indicating a prediction of whether a branch instruction will be taken, and if a branch instruction will be taken, indicating a prediction of which branch in the branch bundle will be taken.

19. A processor comprising:

an instruction cache containing a multiple-target branch instruction, where the multiple-target branch instruction has at least two associated target addresses which are not a fall-through address;

a branch prediction table coupled to the instruction cache for indicating a prediction of a target address for the multiple-target branch instruction, the branch prediction table comprising:

a tag entry associated with the multiple-target branch instruction;

prediction history information for the multiple-target branch instruction stored in a table entry corresponding to the tag associated with the multiple-target branch instruction; and a predicate prediction indicating a prediction of whether a branch will be taken, and if a branch instruction will be taken, indicating a prediction of which target addresses of the multiple target addresses will be taken.

* * * * *